United States Patent
Kito et al.

Patent Number: 5,954,165
Date of Patent: Sep. 21, 1999

[54] DISC ROTOR

[75] Inventors: Masahiro Kito; Norihiro Akita; Masahiko Abe, all of Aichi, Japan

[73] Assignee: Aisin Takaoka Co., Ltd., Toyota, Japan

[21] Appl. No.: 08/841,383

[22] Filed: Apr. 30, 1997

[30] Foreign Application Priority Data

| May 10, 1996 | [JP] | Japan | 8-152839 |
| May 15, 1996 | [JP] | Japan | 8-158774 |
| Nov. 14, 1996 | [JP] | Japan | 8-318738 |

[51] Int. Cl.$^6$ ................................................. F16D 65/12
[52] U.S. Cl. ........................... 188/218 XL; 188/251 M
[58] Field of Search ................ 188/18 A, 218 XL, 188/251 A, 251 M

[56] References Cited

U.S. PATENT DOCUMENTS

| 3,559,775 | 2/1971 | Miller | 188/218 XL |
| 4,807,728 | 2/1989 | Suenaga et al. | |

FOREIGN PATENT DOCUMENTS

| 54-108880 | 7/1979 | Japan . |
| 56-164236 | 12/1981 | Japan . |
| 58-57529 | 4/1983 | Japan . |
| 59-126124 | 7/1984 | Japan . |
| 1189280 | 4/1970 | United Kingdom . |
| 2 106 088 | 4/1983 | United Kingdom . |
| 9607766 | 3/1996 | WIPO . |

OTHER PUBLICATIONS

H. Braun et al., "Temperguss und Grauguss als Bremsenwerkstoff im Fahrzeugbau", *ATZ* (1967) 7, pp. 220–225.

"Brake Disc Rotor Having Induction Annealed Pad Contact Surface", *Research Disclosure*, No. 27911, Jul. 1987.

Machines/Metallic Materials, published by Maruzen K.K., p. 230 (1979).

Micrograph of Iron and Steel and Explanations Thereof, published by Maruzen K.K., edited T. Saito, pp. 236–237 (1985).

Control and Evaluation of High Grade Structure of Cast Iron, pp. 119–128, Nippon Gakujutsu Shinkokai, 24th Committee of Casting, Cast Iron Section.

Control and Evaluation of High Grade Structure of Cast Iron, pp. 119–128, Nippon Gakujutsu Shinkokai, 24th Committee of Casting, Cast Iron Section, plus English translation.

*Primary Examiner*—Robert J. Oberleitner
*Assistant Examiner*—Sarah M. Sawhill
*Attorney, Agent, or Firm*—Burns, Doane, Swecker & Mathis, LLP

[57] ABSTRACT

A disc rotor formed of flaky graphite cast iron in which the natural frequency of the disc rotor is set by the graphite length in the flaky graphite cast iron structure.

For preventing resonant vibrations ascribable to the self-excited vibrations of the component parts of disc brakes, such as pads, the natural frequency of the disc rotor are shifted from the frequency of excited vibrations of the component parts of disc brakes, such as pads.

20 Claims, 1 Drawing Sheet

DISC ROTOR

FIELD OF THE INVENTION

This invention relates to a disc rotor designed to prevent "squeal" produced during brake application. More particularly, it relates to a disc rotor in which, for preventing resonation of the disc rotor due to self-excited vibrations of components of the disc brake, such as a pad (referred to hereinafter as "component parts such as pad"), the natural frequency is offset from the frequency of self-excited vibrations of the component parts such as pad, in order to prevent the "squeal" and in order to assure superior attenuation capability and thermal diffusion properties.

BACKGROUND

If, during braking, the disc rotor is brought into frictional contact with the pad, component parts of the disc brake such as pad, undergoes self-excited vibrations, thus causing vibrations of the disc rotor. If the frequency of the self-excited vibrations of the component parts, such as pad, coincides with the natural frequency of the disc rotor, the disc rotor is set into resonant vibrations, thus producing "squeal".

For preventing the "squeal", the conventional practice has been to shift the natural frequency of the disc rotor from the frequency of self-excited vibrations of the component parts such as pad. In effect, it has been practiced to provide an opening or a groove on the braking surface of the disc rotor (as disclosed in, for example, JP Utility Model Kokai JP-UM-A-54-108880), to have an annular metallic member on the outer periphery of the disc rotor (as disclosed in, for example, JP Patent Kokai JP-A-56-164236) or to use a larger circumferential width of a disc rotor fin (as disclosed in, for example, JP Patent Kokai JP-A-59-126124). There is also disclosed in JP Patent Kokai JP-A-58-57529 a disc rotor in which, for increasing the vibration attenuation capability of a pressure contact portion of the disc rotor rim and for increasing the strength of the center mounting portion as compared to that of the pressure contact rim portion, the cooling velocity of the molten cast iron at the pressure contact rim portion is set to a different value from that at the center mounting portion so that the graphite at the pressure contact rim portion and that at the center mounting portion of the disc rotor will be flaky graphite and fine graphite, respectively.

SUMMARY OF THE DISCLOSURE

The above-described methods disclosed in the JP Utility Model JP-UM-A-54-108880, JP Patent kokai JP-A-56-164236, and JP Patent Kokai JP-A-59-126124, in which the "squeal" is prevented by varying the disc rotator shape, suffers from problems in connection with productivity and strength of the disc rotor. In addition, specified means and guidance for setting the natural frequency of the disc rotor to a pre-set value cannot be obtained from the matter disclosed in the JP patent Kokai JP-A-58-57529. Thus, for setting the natural frequency of the disc rotor to a pre-set value, in accordance with the teaching contained in the Patent Publication, it is necessary to produce a large number of test disc rotors and to repeat tests for measuring the natural frequency.

It is a first object of the present invention to prevent the squeal by a method different from the method of varying the disc rotor shape. In particular, it is an object of the present invention to realize the variation and control of the natural frequency of the disc rotor by controlling the material (material type and structure) of the disc rotor. Further objects of the present invention will become apparent from the overall disclosure.

The present inventors have conducted various experiments and investigations for shifting the natural (characteristic) frequency of the disc rotor without varying the disc rotor shape in order to arrive at the present invention. The present invention has been accomplished with an eye to the fact that, if the carbon equivalent of cast iron (CE value=C wt %+⅓ Si wt %) is increased, flaky graphite having high attenuation capability is crystallized, and that, with increased length of the graphite crystals, the attenuation capability and thermal diffusion are increased. In the present invention, the "length of graphite" means the maximum length, inclusive of the length of the branched portions, while the "average value of the graphite length" is an average value of the measured values of the graphite crystals not shorter than 30 $\mu$m in 1 mm$^2$ and finding the average value.

With increased or decreased graphite length, the natural frequency of the disc rotor is moved towards lower or higher values, respectively. Preferably, the carbon equivalent is adjusted at the time of production for increasing or decreasing the graphite length, while the frequency of the disc rotor is shifted away from the frequency of self-excited vibrations of component parts such as pad, so that the disc rotor is not resonated with self-excited vibrations of component parts such as pad. To this end, the graphite length is adjusted in accordance with the following various aspects.

In a first aspect, a disc rotor is formed of flaky graphite cast iron and is characterized in that the natural frequency of the disc rotor is set by the length of graphite in the flaky graphite cast iron structure.

In a second aspect, the disc rotor in the first aspect is characterized in that, in two of the above disc rotors having equivalent tensile strength, the difference in the natural frequency is proportionate to the difference of average values of the length of graphite.

In a third aspect, the disc rotor in the first aspect is characterized in that the flaky graphite cast iron is equivalent to FC150 and in that the average value of the graphite length is not less than 220 $\mu$m, with the attenuation capability and the heat diffusion capability being not less than $10.0 \times 10^{-1}$ ($Q^{-1}$) and not less than 0.14 cm$^2$/sec, respectively.

In a fourth aspect, a disc rotor is formed of a flaky graphite cast iron and is characterized in that a pre-set natural frequency is set by varying the natural frequency of the disc rotor by measuring the length of graphite in the flaky graphite cast iron structure and the natural frequency of the disc rotor, by adjusting the carbon equivalent in the composition of a starting material depending on the difference between the measured natural frequency and the desired natural frequency and by setting the graphite length.

In a fifth aspect, a disc rotor of flaky graphite cast iron having a pre-set natural frequency in which the graphite length can be controlled at the time of manufacture is characterized in that increase or decrease in the natural frequency is controlled by extension and/or contraction of the graphite length.

In a sixth aspect, a disc rotor of flaky graphite cast iron equivalent to FC150 having a natural frequency in the vicinity of 1000 Hz in which the graphite length can be controlled at the time of manufacture is characterized in that variance in the natural frequency is controlled in accordance with the following equation:

variance in the natural frequency (ΔHz)=A(constant)×variance in graphite length (Δμm)

A (constant)=−0.34 to −0.39 Hz/μm.

In a seventh aspect, in the disc rotor in the sixth aspect, A ( constant) is set so that A (constant)=−0.35 Hz/μm in place of A (constant)=−0.34 to −0.39 Hz/μm.

In an eighth aspect, a disc rotor of flaky graphite cast iron equivalent to FC150 having a frequency of natural frequencies in the vicinity of 2000 Hz in which the graphite length can be controlled at the time of manufacture is characterized in that variance in the natural frequency is controlled in accordance with the following equation:

variance in the natural frequency (ΔHz)=B (constant)×variance in graphite length (Δμm)

B (constant)=−0.19 to −2.2 Hz/μm.

In a ninth aspect, in the disc rotor in the eighth aspect, A ( constant) is set so that B (constant)=−1.98 Hz/μm in place of B (constant)=−0.19 to −2.2 Hz/μm.

In a tenth aspect, a disc rotor of flaky graphite cast iron equivalent to FC150 having a natural frequency in the vicinity of 4000 Hz in which the graphite length can be controlled at the time of manufacture is characterized in that variance in the natural frequency is controlled in accordance with the following equation:

variance in the natural frequency (ΔHz)=C (constant)×variance in graphite length (Δμm)

C (constant)=−3.2 to −3.3 Hz/μm.

In an eleventh aspect, in the disc rotor in the tenth aspect, C ( constant) is set so that C (constant)=−3.25 Hz/μm in place of C (constant)=−3.2 to −3.3 Hz/μm.

In the present application, the statement of the numerical values denotes not only upper and lower limit values but also any intermediate values.

PREFERRED EMBODIMENTS OF THE INVENTION

Figure 1:
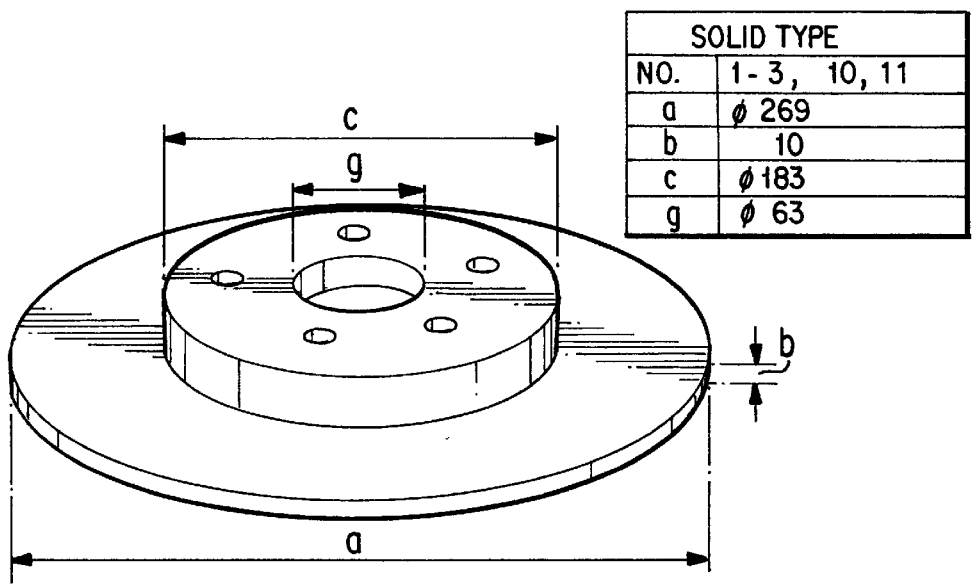
FIG. 1 is a perspective view for illustrating the shape and the size of a solid type disc rotor fabricated by way of examples of the present invention and Comparative Examples.

Preferred embodiments of the present invention will be now explained. In the embodiments of the present invention, the length of flaky graphite of gray cast iron is usually controlled. The graphite length at the time of manufacture is controlled by adjustment of the carbon equivalent and molten metal processing at the time of melting and pouring. Meanwhile, austempering achieves additionally increased attenuation capability. The austempering increases the attenuation capability by increasing the lattice distortion, in particular the ferrite lattice distortion, of the maxtrix surrounding the graphite phase (particles). The matrix structure is transformed by austempering into bainite for exhibiting high attenuation capability. Meanwhile, the bainite structure is liable to undergo transformation at approximately 400° C. Therefore, a disc rotor processed with austempering is used for a brake used at temperatures lower than approximately 400° C.

The disc rotor according to an embodiment of the present invention is preferably formed of flaky graphite cast iron equivalent to FC150, such as one given below. That is, the chemical composition in wt % is C: 3.55 to 3.70; Si :1.8 to 2.2%; Mn: 0.5 to 1.2%; P: not more than 0.4%; S: not more than 0.15%; the balance being Fe, with the carbon equivalent being not higher than 4.4%. As impurities, the composition may contain Cr: not more than 0.1%, Cu: not more than 0.2%; Mo: not more than 0.1% and preferably not more than 0.02%; Sn: not more than 0.03%; and Sb: not more than 0.05%.

The matrix structure accounts for not less than 95% in terms of the pearlite area ratio, with an average graphite length being 220 to 290 μm, with a tensile strength not being less than 150 MPa, preferably not less than 175 MPa and more preferably not less than 210 MPa. For realizing the attenuation capability, expressed logarithmic decrement, of not less than $10.0\times10^{-3}$ $(Q^{-1})$ and a thermal diffusion ratio of not less than 0.14 cm$^2$/sec, flaky graphite cast iron equivalent to FC150 with an average graphite length of not less than 220 μm is preferred.

The attenuation capability is not less than $10.0\times10^{-3}$ $(Q^{-1})$, preferably not less than $12.0\times10^{-3}(Q^{-1})$ and more preferably not less than $14.0\times10^{-3}$ $(Q^{-1})$. The thermal diffusion ratio is not less than 0.14 cm$^2$/sec for reducing the squeal of 1000 to 4000 Hz at the time of braking and braking vibrations due to partial wear under elevated temperatures.

In accordance with the preferred embodiments, the chemical composition is explained for the flaky graphite cast iron equivalent to FC150.

(1) If an upper limit value of 3.70% for C, upper limit value of 2.2% for Si or an upper limit value of 4.4% for the carbon equivalent is exceeded, the tensile strength does not reach 150 MPa.

(2) If the amount of C is less than the lower limit value of 3.55% and the amount of Si is less than the lower limit value of 1.8%, the attenuation capability of $10.0\times10^{-3}$ $(Q^{-1})$ or the thermal diffusion ratio of not less than 0.14 cm$^2$/sec is not met.

(3) If the amount of Mn is less than 0.5%, the tensile strength of not less than 150 MPa is not met. If the amount of Mn exceeds 1.2%, machinability is deteriorated.

(4) If P exceeds 0.4%, much steadite is precipitated thus deteriorating machinability and lowering dynamic frictional coefficient of the disc rotor.

(5) If S exceeds 0.15%, sound flaky graphite can hardly be obtained.

(6) If the amounts of impurities Cr, Mo, Sn or Sb exceed the respective upper limit values, the thermal diffusion ratio is lowered. If the amount of the impurity Cu exceeds the upper limit value, the dynamic frictional coefficient of the disc rotor is lowered.

The natural frequency of the disc rotor according to the embodiment of the present invention may be adjusted as follows: That is, (i) the disc rotor shape is designed by the finite element method (FEM) taking into account the strength, cooling performance, braking capability and the natural frequency of the disc rotor. Meanwhile, in designing the rotor shape, there are many factors to be taken into consideration, such that it is actually difficult to take into account the natural frequency sufficiently in designing the rotor shape from the outset so that the natural frequency will become precisely equal to the pre-set value.

(ii) A disc rotor is tentatively produced based on the above design.

(iii) The graphite length and the natural frequency of the tentatively produced disc rotor are measured (sampling).

(iv) It is checked on an actual system loading the disc rotor whether resonant vibrations are produced.

(v) If resonant vibrations are produced, a natural frequency of the disc rotor that does not produce the resonant vibrations is set as a target value.

(vi) From the relationship between the variance of the natural frequency and the variance of the graphite length, the target graphite length is found. If this relationship has not been found, plural disc rotors having different graphite lengths are tentatively produced, and the frequencies of the natural vibrations thereof are sampled for setting the proportionality constant of the relationship.

(vii) By adjustment of the ingredients and/or by varying the processing for molten metal, a disc rotor having the structure with the above target graphite length is produced.

EXAMPLES

Referring to the drawings, examples of the present invention will be explained. The starting material for melting, mainly composed of recycled gray cast iron and steel scrap, was adjusted to a chemical composition depending on targeted amounts of respective ingredients. A high-frequency induction furnace with a capacity of 50 kg was used for melting the starting material. The starting material, charged into a ladle, was inoculated with 0.1 to 0.2% of an Fe–75% Si system, for producing a disc rotor of the present embodiment composed of flaky graphite cast iron equivalent to FC150 of the present embodiment. The chemical composition, tensile strength, graphite area ratio and the average graphite length are shown in Table 1, while the natural frequency, attenuation capability and thermal diffusion ratio are shown in Table 2. In Tables 1 and 2, the disc rotors Nos. 1 to 9 are disc rotors of the present embodiment, while the disc rotors Nos. 10 to 13 are disc rotors of flaky graphite cast iron equivalent to FC200 as comparative examples for the disc rotors Nos. 1 to 9 formed of flaky graphite cast iron equivalent to FC150.

Meanwhile, "Instron" universal tester was used for measuring tensile strength. In observing the structure, a sample obtained on mirror-finish grinding a sliced surface section was observed using an optical microscope and an image processing device for measuring the graphite area ratio and the average graphite length. For measuring the average graphite length, the graphite flakes having the graphite length of not less than 30 $\mu$m within 1 mm$^2$ were measured and an average value was found. The attenuation capability was measured by measuring the vibrations at free ends of an attenuation test sample by a bifocal suspension method. Specifically, the attenuation test sample was clamped by a vise and the distal end of the test sample was vibrated by an electromagnetic vibrator. After the end of vibrations, the attenuation waveform was sampled. For sampling the vibrations, an acceleration pickup was used. From the attenuation waveform, thus found, an amplitude $A_O$ immediately before termination of vibrations and an amplitude $A_n$ of an n'th crest equal to one-third of the initial amplitude were measured. Also, from the equation:

$$Q^{-1} = -1/\pi \times 1/n \times ln(A_n/A_0)$$

the attenuation capability $Q^{-1}$ was found.

TABLE 1

| | Disc Rotor No. | | Chemical Composition (wt %) | | | | | CE value | Tensile Strength (MPa) | Graphite Area Rate (%) | Average Graphite Length ($\mu$m) |
| | | | C | Si | M | P | S | | | | |
| --- | --- | --- | --- | --- | --- | --- | --- | --- | --- | --- | --- |
| Examples | Solid Type | 1 | 3.57 | 1.89 | 0.65 | 0.033 | 0.093 | 4.20 | 208 | 13.7 | 245 |
| | | 2 | 3.63 | 1.89 | 0.60 | 0.035 | 0.084 | 4.26 | 195 | 14.2 | 259 |
| | Ventilated Type | 3 | 3.69 | 2.09 | 0.58 | 0.038 | 0.094 | 4.39 | 183 | 15.0 | 274 |
| | | 4 | 3.55 | 2.15 | 0.63 | 0.032 | 0.088 | 4.27 | 193 | 14.0 | 258 |
| | | 5 | 3.63 | 2.10 | 0.65 | 0.035 | 0.096 | 4.33 | 188 | 14.6 | 272 |
| | | 6 | 3.68 | 2.12 | 0.59 | 0.031 | 0.093 | 4.39 | 179 | 15.1 | 286 |
| | Ventilated Type | 7 | 3.56 | 2.05 | 0.68 | 0.033 | 0.096 | 4.24 | 190 | 13.9 | 239 |
| | | 8 | 3.65 | 2.11 | 0.65 | 0.030 | 0.084 | 4.35 | 179 | 14.5 | 265 |
| | | 9 | 3.70 | 2.04 | 0.63 | 0.031 | 0.092 | 4.38 | 175 | 15.0 | 274 |
| Comparative Examples | Solid Type | 10 | 3.35 | 2.03 | 0.61 | 0.031 | 0.086 | 4.02 | 203 | 13.2 | 178 |
| | | 11 | 3.16 | 2.02 | 0.68 | 0.035 | 0.082 | 3.83 | 288 | 11.3 | 154 |
| | Ventilated Type | 12 | 3.33 | 1.85 | 0.65 | 0.033 | 0.093 | 3.95 | 199 | 13.1 | 185 |
| | | 13 | 3.21 | 1.96 | 0.72 | 0.033 | 0.093 | 3.86 | 275 | 12.4 | 167 |

TABLE 2

| | Disc Rotor No. | | Natural Frequency (Hz) | | | Attenuation Capability ($Q^{-1} \times 10^{-3}$) | Thermal Diffusion Ratio (cm$^2$/second) |
| | | | near 1000 Hz | near 2000 Hz | near 4000 Hz | | |
| --- | --- | --- | --- | --- | --- | --- | --- |
| Examples | Solid Type | 1 | 1295 | 2365 | 4320 | 12.4 | 0.146 |
| | | 2 | 1290 | 2335 | 4275 | 13.7 | 0.152 |
| | | 3 | 1285 | 2305 | 4225 | 14.2 | 0.160 |
| | Ventilated Type | 4 | 975 | 2200 | 3590 | 13.9 | 0.152 |
| | | 5 | 970 | 2170 | 3545 | 14.2 | 0.158 |
| | | 6 | 965 | 2140 | 3500 | 14.5 | 0.164 |

TABLE 2-continued

| | Disc Rotor No. | | Natural Frequency (Hz) | | | Attenuation Capability ($Q^{-1} \times 10^{-3}$) | Thermal Diffusion Ratio (cm²/second) |
|---|---|---|---|---|---|---|---|
| | | | near 1000 Hz | near 2000 Hz | near 4000 Hz | | |
| | Ventilated Type | 7 | 1155 | 2610 | 4150 | 13.2 | 0.146 |
| | | 8 | 1145 | 2560 | 4065 | 13.8 | 0.156 |
| | | 9 | 1145 | 2540 | 4035 | 14.0 | 0.159 |
| Comparative Examples | Solid Type | 10 | 1320 | 2175 | 4000 | 8.8 | 0.115 |
| | | 11 | 1330 | 2225 | 4080 | 7.9 | 0.101 |
| | Ventilated Type | 12 | 1000 | 2345 | 3835 | 9.1 | 0.122 |
| | | 13 | 1005 | 2380 | 3895 | 8.7 | 0.112 |

Disc rotors Nos. 1 to 3 of the present embodiment are of the solid type, disc rotors Nos. 4 to 9 of the Comparative Examples are of the ventilated type, while disc rotors Nos. 10 and 11 are of the solid type, and Nos. 12 and 13 are of the ventilated type. Disc rotors Nos. 1 to 3 of the present embodiment are of the same shape, while the disc rotors Nos. 4 to 6 are similarly of the same shape. Disc rotors Nos. 7 to 9 are also of the same shape. It should be noted that the disc rotors Nos. 1 to 3, the disc rotors Nos. 4 to 6 and the disc rotors Nos. 7 to 9 are different in shape from one another. The disc rotors Nos. 10 and 11 are of the same shape as the disc rotors Nos. 1 to 3 of the present embodiment, while the disc rotors Nos. 12 and 13 of the Comparative Examples are of the same shape as the disc rotors Nos. 4 to 6 of the present embodiment. It should however be noted that the disc rotors Nos. 10 and 11 (solid type) are different in shape from the disc rotors Nos. 12 and 13 (ventilated type).

Figure 2:
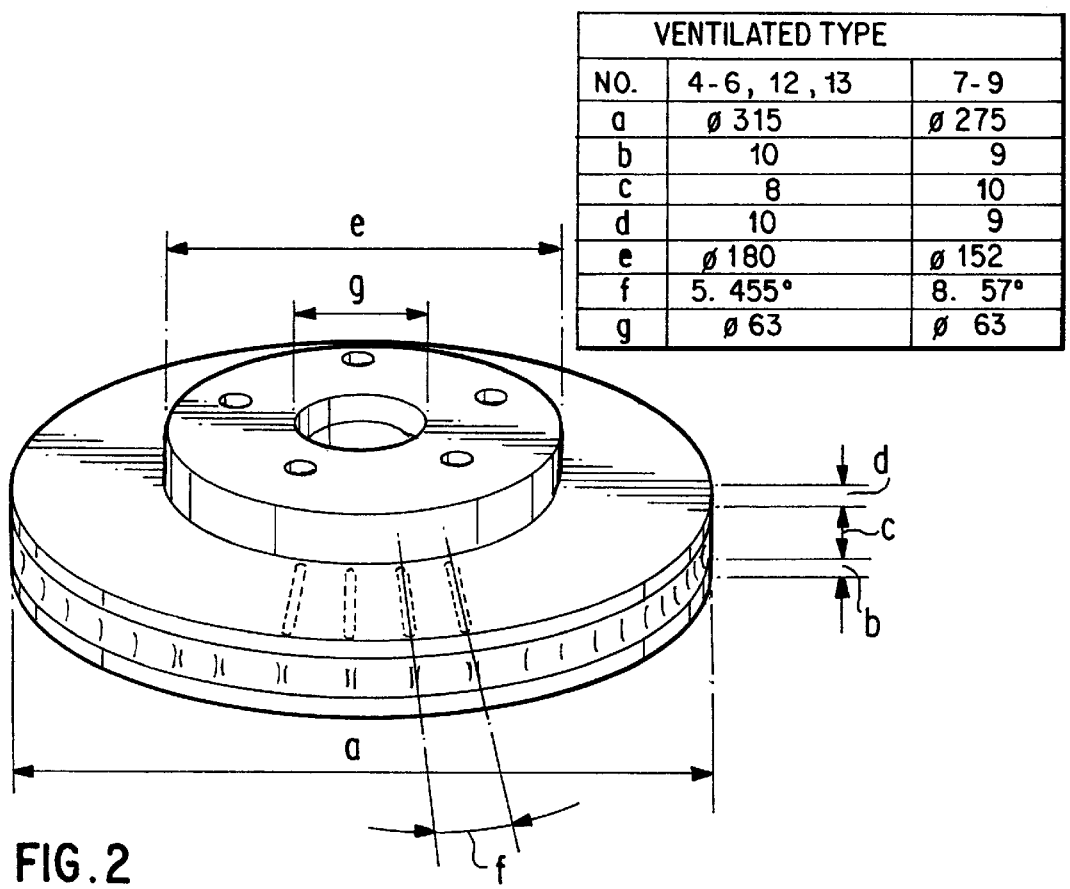
FIG. 2 is a perspective view for illustrating the shape and the size of a ventilated type disc rotor fabricated by way of examples of the present invention and Comparative Examples.

FIGS. 1 and 2 illustrate the shape of a solid type and that of a ventilated type, respectively. The disc rotor of the solid type (Nos. 1 to 3 and Comparative Examples Nos. 10 and 11) is of 269 mm(outer diameter)×183 mm (inner diameter)×10 mm (thickness)(refer to FIG. 1). The sizes of the first ventilated type (Nos. 4 to 6 and Comparative Examples Nos. 12 and 13) and the second ventilated type are as shown in FIG. 2. The diameters of the center apertures of the solid type and the first and second ventilated types are all 60 mm.

In the disc rotor groups Nos. 1 to 3, Nos. 4 to 6, Nos. 7 to 9, Nos. 10 and 11 and Nos. 12 and 13, the ratio of change of the natural frequency with respect to the average value of the graphite length (in the longitudinal direction) was found. The ratio of change A (constant) in the vicinity of 1000 Hz, the ratio of change B (constant) in the vicinity of 2000 Hz, and the ratio of change C (constant) in the vicinity of 4000 Hz, as found, are shown in Table 3. The above constants, indicating the ratio of the change of the natural frequency with respect to the change of the average value of the graphite length, were found by regression analysis.

TABLE 3

| | Disc Rotor No. | Ratio of Variance of Natural Frequency to Variance of Average Value of Graphite Length | | |
|---|---|---|---|---|
| | | A (Constant) | B (Constant) | C (Constant) |
| Examples | Solid Type 1–3 | −0.34 | −2.07 | −3.28 |
| | Ventilated type 4–6 | −0.36 | −2.14 | −3.21 |
| | Ventilated Type 7–9 | −0.39 | −1.98 | −3.28 |

TABLE 3-continued

| | Disc Rotor No. | Ratio of Variance of Natural Frequency to Variance of Average Value of Graphite Length | | |
|---|---|---|---|---|
| | | A (Constant) | B (Constant) | C (Constant) |
| | Solid Type 10–11 | −0.42 | −2.08 | −3.33 |
| | Ventilated Type 12–13 | −0.28 | −1.94 | −3.33 |

From Tables 1 to 3, it has been found that (i) the change of the natural frequency is linearly proportional to the change of the average value of the graphite length. It has also been found that (ii) the proportionality constant differs depending on areas of the natural frequency (e.g., 1000 Hz, 2000 Hz or 4000 Hz). It has similarly been found that (iii) the proportionality constants of disc rotors formed of materials of substantially equal tensile strength are substantially equal despite the difference in toughness ascribable to the difference in shape, that is the solid type Adz or the ventilated type. That is, the natural frequency is a function of toughness and hence is significantly varied depending on changes in the thickness of the vibrating surface having bearing with the toughness. That is, it has been found that, while the solid type and the ventilated type differ in shape from each other, as shown in FIGS. 1 and 2, and hence differ in the natural frequency, the two types of the disc rotors formed of materials of substantially the same tensile strength exhibit the same tendency insofar as the relationship between the variance of the average value of the graphite length and the variance of the natural frequency is concerned.

From the above results, it has been found that the natural frequency can be controlled to a desired pre-set value by controlling the graphite length, and that, among the disc rotor groups having similar values of tensile strength despite difference in toughness, the proportionality constants representing the numerical relationship shows the same tendency of the relationship between the variance of the average value of the graphite length and the variance of the natural frequency in the vicinity of a pre-set natural frequency. Therefore, on occurrence of resonant vibrations in a given shape, a pre-set value of the natural frequency can be realized by adjusting the composition and/or by processing the molten metal for adjusting the graphite length by pre-set values, so that, by controlling the graphite length for finely turning the natural frequency of the disc rotor to a pre-set target value, the resonant vibrations can be eliminated without changing the disc rotor shape (design) for the purpose of overcoming the resonant vibrations. In addition, since the relationship between the variance of the average value of the graphite length and the variance of the natural frequency is given by a specified equation, the graphite length to be formed by composition adjustment and/or processing of molten metal (e.g., heat treatment) can be clarified such that the natural frequency can be easily set at a preset value or range.

With the disc rotor formed of a material equivalent to FC150 of the present embodiment, the ratio of the variance of the natural frequency to the variance of the average value of the graphite length ($\mu$m) for the natural frequency in the vicinity of 1000 Hz is −0.34 to −0.39 Hz/$\mu$m and preferably −0.35 Hz/$\mu$m, while that in the vicinity of 2000 Hz is −1.9 to −2.2 Hz/$\mu$m and preferably −1.98 Hz/$\mu$m and that in the vicinity of 4000 Hz is −3.2 to −3.3 Hz/$\mu$m and preferably −3.25 Hz/$\mu$m.

In addition, the disc rotors Nos. 1 to 9 of the present embodiment, formed of a material equivalent to FC150, are of a CE value of not less than 4.2 wt %, graphite area ratio of not less than 13.5%, average graphite length of not less than 240 $\mu$m, attenuation capability of not less than $12\times10^{-3}$ ($Q^{-1}$) and thermal diffusion ratio of 0.14 cm$^2$/sec, and is excellent in the attenuation capability and thermal diffusion ratio as compared to the disc rotors Nos. 10 to 13 formed of a material equivalent to FC200 of the Comparative Examples.

Effect of the Invention is summarized as follows, but without restriction.

According to the present invention, since the natural frequency of the disc rotor can be varied by controlling the graphite length and the natural frequency of the disc rotor can be shifted from the frequency of excited vibrations of component parts such as pad, "squeal" can be prevented without changing the disc rotor shape (first, fourth and fifth aspects). Moreover, the disc rotor of the present invention, in particular the disc rotor formed of a material equivalent to FC150, with the average graphite length of not less than 220 $\mu$m, has superior thermal diffusion and is not susceptible to heat spots on braking surface, so that the disc rotor is not subjected to vibrations ascribable to partial wear of the braking surface and, in conjunction with superior attenuation capability, the disc rotor is not subjected to vibrations, while "squeal" can be effectively prevented to improve running stability (in particular, third aspect).

In addition, there is a linear relationship between the change of the natural frequency and changes of the graphite length in the vicinity of the pre-set natural frequency (second aspect). Furthermore, since the values of the proportionality constants in the equation representing this proportional relation are obtained (sixth to eleventh aspects), and hence the change of the natural frequency responsive to changes of the graphite length can be specified by numerical values, disc rotors having the desired natural frequency can be fabricated easily (second and sixth to eleventh aspects).

As many apparently widely different embodiments of the present invention can be made without departing from the spirit and scope thereof, it is to be understood that the invention is not limited to the specific embodiments thereof except as defined in the appended claims.

What is claimed is:

1. A disc rotor formed of flaky graphite cast iron and possessing a desired natural frequency, the disc rotor being produced by setting the length of graphite in the flaky graphite cast iron based on the desired natural frequency to produce the disc rotor having said desired natural frequency.

2. The disc rotor as defined in claim 1, wherein the flaky graphite cast iron is equivalent to FC150 and in that the average value of the graphite length is not less than 220 $\mu$m, with attenuation capability and heat diffusion capability being not less than $10.0\times10^{-3}$ ($Q^{-1}$) and not less than 0.14 cm$^2$/sec, respectively.

3. A disc rotor formed of flaky graphite cast iron possessing a desired natural frequency by measuring the length of graphite in the flaky graphite cast iron of a sample disc rotor and the natural frequency of the sample disc rotor, adjusting the carbon equivalent in the composition of a starting material based on the difference between the measured natural frequency and the desired natural frequency, and using the composition with the adjusted carbon equivalent to produce a disc rotor formed of flaky graphite cast iron having the set graphite length and the desired natural frequency.

4. A disc rotor of flaky graphite cast iron having a pre-set natural frequency formed by controlling the graphite length of the flaky graphite cast iron at the time of manufacture based on the preset natural frequency to produce the disc rotor having the pre-set natural frequency.

5. A disc rotor of flaky graphite cast iron equivalent to FC150 having a natural frequency in the vicinity of 1000 Hz formed by controlling the graphite length at the time of manufacture, and controlling variance in the natural frequency in accordance with the following equation:

variance in the natural frequency ($\Delta$Hz)=A(constant)×variance in graphite length ($\Delta\mu$m)

A (constant)=−0.34 to −0.39 Hz/$\mu$m.

6. The disc rotor as defined in claim 5 wherein A (constant)=−0.35 Hz/$\mu$m.

7. A disc rotor of flaky graphite cast iron equivalent to FC150 having a natural frequency in the vicinity of 2000 Hz formed by controlling the graphite length at the time of manufacture, and controlling variance in the natural frequency in accordance with the following equation:

variance in the natural frequency ($\Delta$Hz)=B (constant)×variance in graphite length ($\Delta\mu$m)

B (constant)=−0.19 to −2.2 Hz/$\mu$m.

8. The disc rotor as defined in claim 7 wherein B (constant)=−1.98 Hz/$\mu$m.

9. A disc rotor of flaky graphite cast iron equivalent to FC150 having a natural frequency in the vicinity of 4000 Hz formed by controlling the graphite length at the time of manufacture, and controlling variance in the natural frequency in accordance with the following equation:

variance in the natural frequency ($\Delta$Hz)=C (constant)×variance in graphite length ($\Delta\mu$m)

C (constant)=−3.2 to −3.3 Hz/$\mu$m.

10. The disc rotor as defined in claim 9 wherein C (constant).=−3.25 Hz/$\mu$m.

11. A method of producing a cast iron disc rotor formed of flaky graphite cast iron, comprising:

preparing a cast iron disc rotor of flaky graphite using a relationship between the natural frequency of a flaky graphite cast iron disc rotor and the length of flaky graphite in the flaky graphite cast iron disc rotor, so that the cast iron disc rotor of flaky graphite possesses a natural frequency based on the length of graphite.

12. The method as defined in claim 11, wherein the flaky graphite cast iron is equivalent to FC150 and the average value of the graphite length is controlled to be not less than 220 μm, with attenuation capability and heat diffusion capability being controlled to not less than $10.0 \times 10^{-3}(Q^{-1})$ and not less than 0.14 cm²/sec, respectively.

13. A method of producing a disc rotor formed of flaky graphite cast iron, comprising:

measuring the length of graphite in a disc rotor formed of flaky graphite cast iron and the natural frequency of the disc rotor formed of flaky graphite cast iron;

adjusting the carbon equivalent in the composition of a starting material based on a difference between the measured natural frequency and a desired natural frequency to set a graphite length; and using the composition of starting material to produce a disc rotor of flaky graphite cast iron having the desired natural frequency and the set graphite length.

14. A method of producing a disc rotor of flaky graphite cast iron having a pre-set natural frequency, comprising controlling the graphite length in a disc rotor of flaky graphite cast iron at the time of manufacture based on the pre-set natural frequency to produce the disc rotor having the pre-set natural frequency.

15. A method of producing a disc rotor of flaky graphite cast iron comprising:

casting a flaky graphite cast iron melt into a flaky graphite cast iron disc rotor equivalent to FC150 having a natural frequency in the vicinity of 1000 Hz and controlling the graphite length at the time of manufacture; and controlling variance in the natural frequency of the disc rotor in accordance with the following equation:

variance in the natural frequency (ΔHz)=A(constant)×variance in graphite length (Δμm)

A (constant)=−0.34 to −0.39 Hz/μm.

16. The method as defined in claim 15 wherein A (constant) is set so that A (constant)=−0.35 Hz/μm.

17. A method of producing a disc rotor of flaky graphite cast iron comprising:

casting a flaky graphite cast iron melt into a flaky graphite cast iron member equivalent to FC150 having a natural frequency in the vicinity of 2000 Hz and controlling the graphite length at the time of manufacture; and controlling variance in the natural frequency in accordance with the following equation:

variance in the natural frequency (ΔHz)=B (constant)×variance in graphite length (Δμm)

B (constant)=−0.19 to −2.2 Hz/μm.

18. The method as defined in claim 17 wherein B (constant) is set so that B (constant)=−1.98 Hz/μm.

19. A method of producing a disc rotor of flaky graphite cast iron comprising:

casting a flaky graphite cast iron melt into a flaky graphite cast iron member equivalent to FC150 having a natural frequency in the vicinity of 4000 Hz and controlling the graphite length at the time of manufacture; and controlling variance in the natural frequency in accordance with the following equation:

variance in the natural frequency (ΔHz)=C (constant)×variance in graphite length (Δμm)

C (constant)=−3.2 to −3.3 Hz/μm.

20. The method as defined in claim 19 wherein C (constant) is set so that C (constant)=−3.25 Hz/μm.

* * * * *

UNITED STATES PATENT AND TRADEMARK OFFICE
CERTIFICATE OF CORRECTION

PATENT NO. : 5,954,165
DATED : September 21, 1999
INVENTOR(S) : Masahiro KITO; Norihiro AKITA and Masahiko ABE It is certified that error appears in the above-identified patent and that said Letters Patent is hereby corrected as shown below:

Claim 7, last line: "0.19" should read --1.9--.

Claim 17, last line: "0.19" should read --1.9--.

Signed and Sealed this

First Day of May, 2001

Attest:

NICHOLAS P. GODICI

Attesting Officer    Acting Director of the United States Patent and Trademark Office